W. MOLLIER.
THREE-PHASE DRIVING SYSTEM FOR MARINE PROPELLERS.
APPLICATION FILED JAN. 7, 1921.

1,433,089.

Patented Oct. 24, 1922.
2 SHEETS—SHEET 1.

Inventor
Walther Mollier
by Knight Bro.
Attorneys

W. MOLLIER.
THREE-PHASE DRIVING SYSTEM FOR MARINE PROPELLERS.
APPLICATION FILED JAN. 7, 1921.

1,433,089. Patented Oct. 24, 1922.
2 SHEETS—SHEET 2.

Inventor:
Walther Mollier
by Knight Bro
attys.

Patented Oct. 24, 1922.

1,433,089

UNITED STATES PATENT OFFICE.

WALTHER MOLLIER, OF VIENNA, AUSTRIA, ASSIGNOR TO SIEMENS-SCHUCKERTWERKE GESELLSCHAFT MIT BESCHRANKTER HAFTUNG, OF SIEMENSSTADT, NEAR BERLIN, GERMANY, A CORPORATION OF GERMANY.

THREE-PHASE DRIVING SYSTEM FOR MARINE PROPELLERS.

Application filed January 7, 1921. Serial No. 435,768.

*To all whom it may concern:*

Be it known that I, WALTHER MOLLIER, a citizen of the German Empire, residing at Vienna, Austria, have invented certain new and useful Improvements in Three-Phase Driving Systems for Marine Propellers, of which the following is a specification.

My invention relates to a novel three-phase driving system for marine propellers, and more especially to a system comprising a plurality of generators for single frequency, and a single generator for double frequency.

I am aware that three-phase generators, as also motors, have already been subdivided into sections for the purpose of allowing a thorough regulation to be effected and likewise for reasons of economy, by causing one set of generators to be connected to a set of motors, in the case of which both the generators as also the motors of these respective sets embody a different number of poles, so that by a varying combination of motors and generators there are secured different rates of speed.

It is an object of this invention to still further considerably increase the range of regulation possible, at a very advantageous distribution of electrical energy, in connection with a three phase driving arrangement for marine propellers comprising a plurality of generators for a certain frequency, and a single generator for twice this frequency; comprising further a motor set consisting of a number of motors having a certain number of poles and another for twice that number of poles, in the case of which a generator, having a single frequency, is connected to a motor having a double set of poles in order to obtain a lower rate of speed.

According to this invention, the set of motors intended to drive the propeller is for its part driven by two sets of generators, each set consisting of a plurality of generators, said sets being separately adjustable regarding their speed.

A driving arrangement embodying my invention is illustrated diagrammatically by way of example in the drawings affixed to this specification and forming a part thereof.

In these drawings:—

Figure 1:
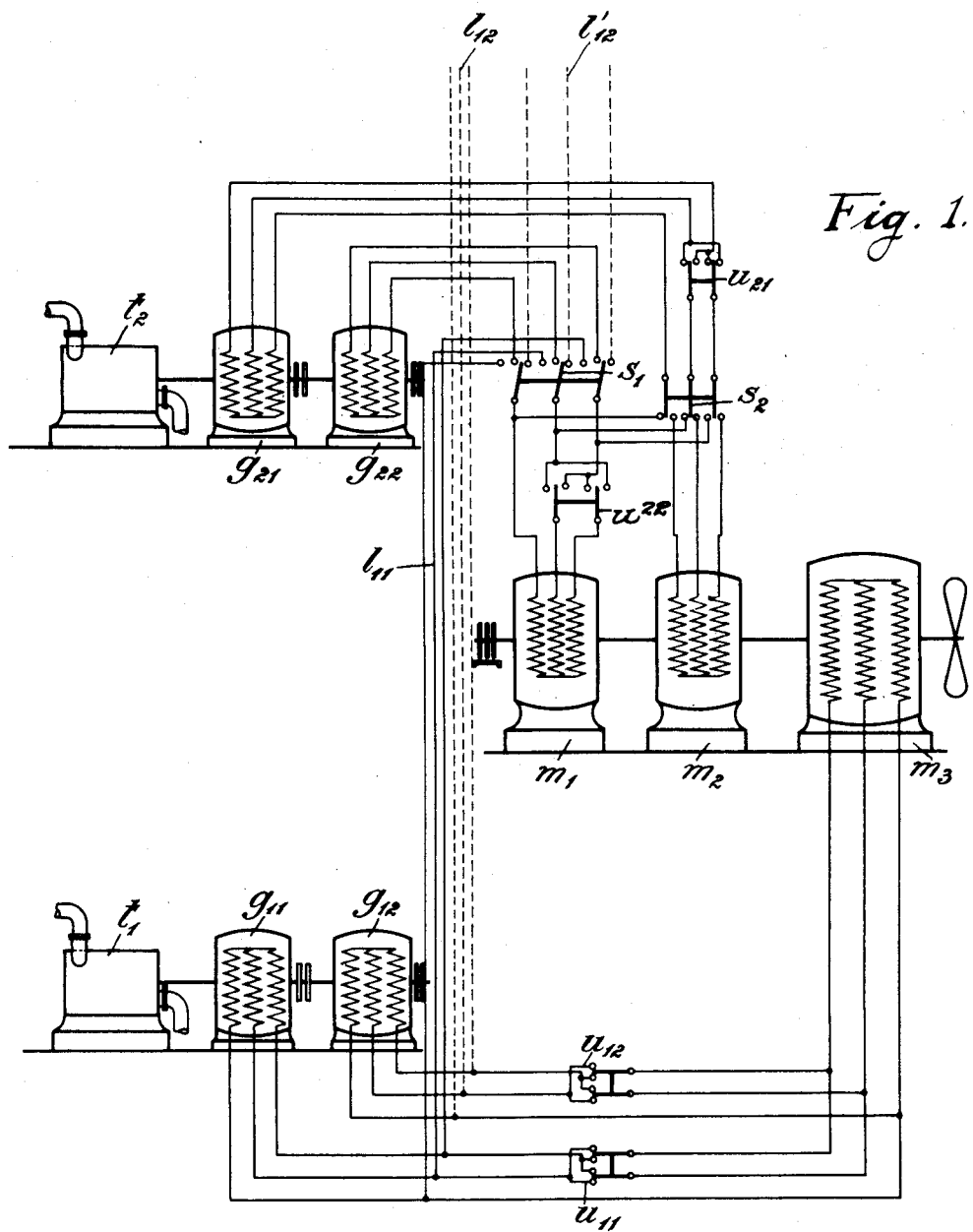
Fig. 1 represents a drive system for a single propeller vessel.

The reference letters $t_1$—$t_2$ in Fig. 1 denote the prime movers, for instance, steam turbines, belonging to the two sets of generators comprising the generators $g_{11}$, $g_{12}$ and $g_{21}$, $g_{22}$, respectively, of preferably equal size. It is assumed that the generator $g_{22}$ of one generator set is like the motor $m_1$ of the motor set, adapted for double frequency, while on the motor shaft are arranged two additional motors $m_2$, $m_3$ for single frequency. Motor $m_1$ for double frequency is intended to act chiefly as the cruising motor and is provided with suitable starting and regulating devices either on the outside of the motor or else in the stator or the rotor; such as, starting resistances, starting windings, windings allowing of a change of the pole connections, and the like (not shown here).

If it be now intended that the vessel shall be driven at a moderate rate of speed, say for example, cruising speed, then one of the generator sets, for instance, $t_1$ is set in motion, generator $g_{11}$ is excited, and connected to motor $m_1$ across main $l_{11}$, said motor being started by means of suitable starting devices. The generators $g_{11}$, $g_{12}$ may either be combined into one generator unit, or else they may be designed as two separate generators. This latter arrangement will prove particularly suitable if the generator $g_{12}$ be employed for the purpose of feeding cruising motors of other propeller shafts (not shown) across the main $l_{12}$, because in that case a separate regulation of the cruising motors will be rendered possible. On the other hand, in the case of big marine installations, such a subdivision of this generator will be required in and for itself, as it finally also makes it possible to employ generators of equal output for driving the entire installation.

The aforesaid system of connection will as a rule suffice for cruising purposes, by using merely one set of generators $t_1$ or else $t_2$, while the rest of the generator sets and motors $m_2$, $m_3$ remain out of operation.

If, on the other hand, it be a question of driving the vessel at maximum speed, then the improved method hereinafter described will be found to yield an extraordinarily favorable utilization of all machines on board the vessel, while at the same time the controlling possibilities are the best imaginable.

According to this invention the generator set $t_2$ is first set in motion, and raised to about half speed. Hereupon, generator $g_{21}$, which embodies an average number of poles, is excited, and connected across switch $s_2$ to the motor $m_1$, which latter for its part is provided with a double number of poles. The said motor being constructed for a frequency double that of the generator, it runs at half the number of revolutions of the appertaining generator, so that consequently the propeller shaft will work at a quarter of the highest speed. By suitable regulation of the dynamos, the speed of the generator set $t_2$ may be increased to full speed, and thus the speed of the propeller shaft will increase to half highest speed. Hereupon, generators $g_{11}$, $g_{12}$ of the other generator set are raised to about half speed and connected to the motor $m_3$. By suitable excitation, generators $g_{11}$, $g_{12}$ are loaded in correspondence with this particular number of revolutions, while the excitation of generator $g_{21}$ may be stopped and the generator thus relieved. As soon as generators $g_{11}$, $g_{12}$ furnish the driving power, switch $s_2$ is reversed and switch $s_1$ put into the central position, so that henceforth generator $g_{21}$, which has a single set of poles, will act on the motor $m_2$ which is likewise provided with a single set of poles, while generator $g_{22}$—which embodies a double set of poles—is connected to the motor $m_1$ also embodying a double set of poles. By gradually exciting these generators, as also by further increasing the number of revolutions of the generator set $t_1$, there is thus finally attained the maximum number of revolutions while all machines are subjected to full load. Motor $m_3$ must, of course, be so dimensioned that it will be able to take up the total output of both generators $g_{11}$ and $g_{12}$ at the full number of revolutions.

Owing to this peculiar system of connection, according to which the division of the generator sets into two parts, and the different number of poles for the motors and generators is utilized in such a manner that the motor set driving the propellers is for its part driven by two generator sets, each comprising a plurality of generators, and said generator sets being separately adjustable with regard to their speed, there results an exceptionally advantageous method of regulation with regard to an accurate adjustment of the speed, while at the same time the system of connection is the most economical possible.

Again, when it is required to reverse the vessel, then use is made of the change-over switches $u_{11}$, $u_{12}$, $u_{21}$, $u_{22}$. Though these switches are disposed in the heavy current circuits, they may, nevertheless, as will be understood from the method of regulation hereinbefore described, be readily reversed in a dead state. These switches are preferably operated by means of special control devices from a single point of the system. The regulation of the prime mover speed is likewise suitably effected by electric means and from the same place (not shown here).

Figure 2:
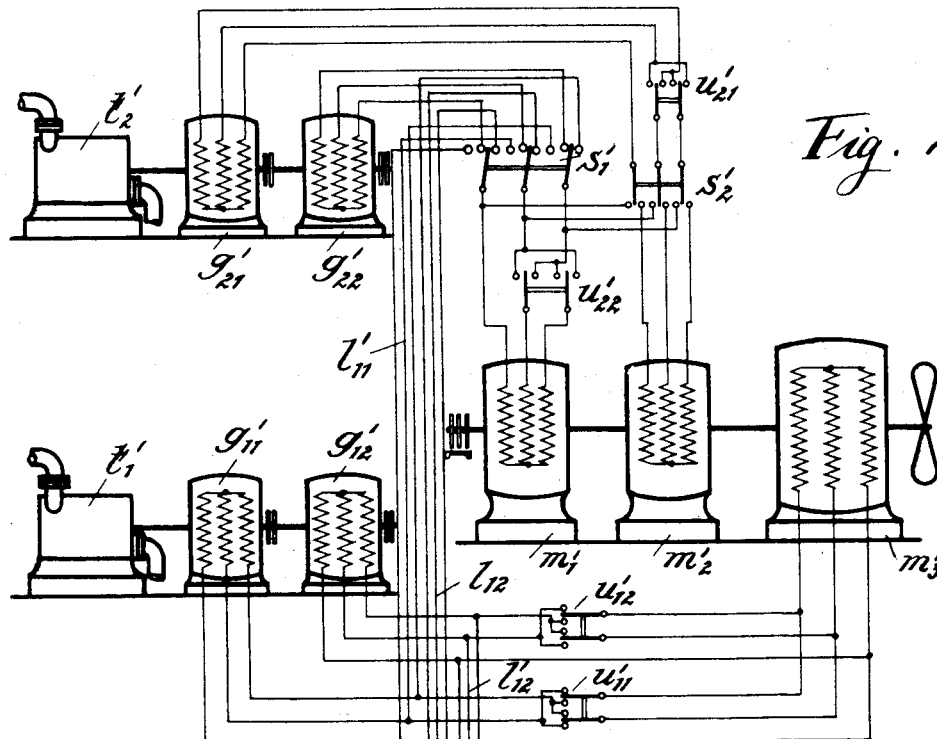
Fig. 2 represents a driving system for a multiple propeller vessel.
Figure 2:
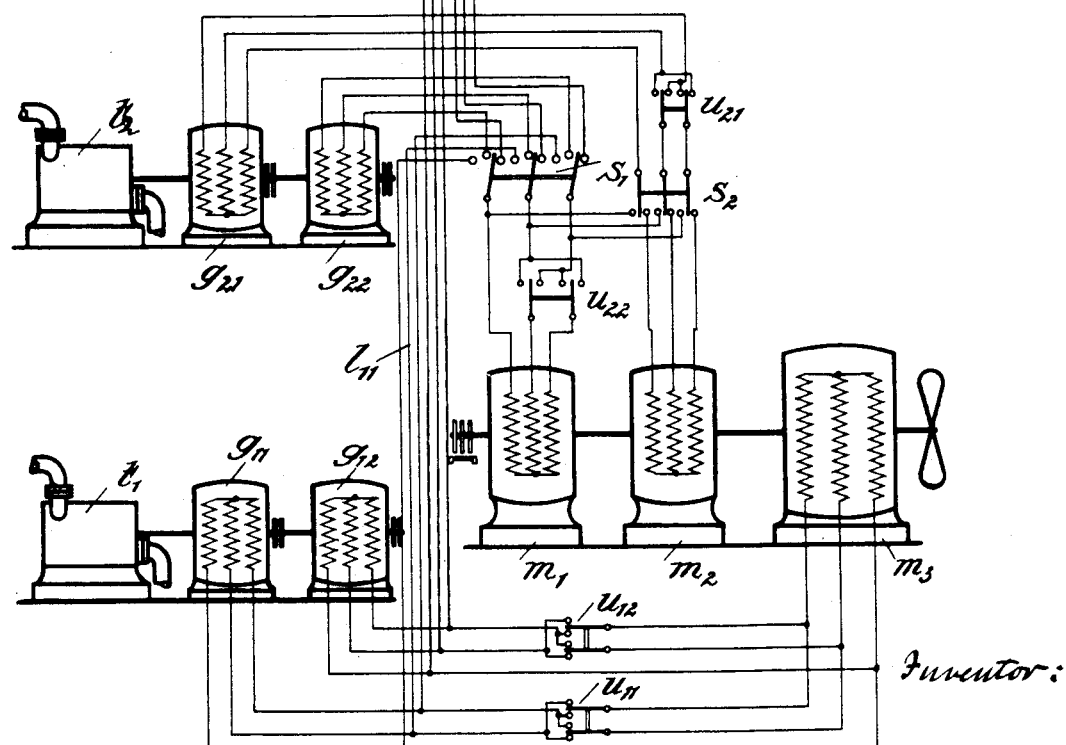

The system of connection as disclosed in Fig. 1 of the drawings corresponds to an installation on board a single propeller vessel or to that on one side of a multiple propeller vessel. In the latter case a suitable communication may be established by means of mains $l_{12}$, $l'_{12}$ between the two systems of connection on both sides of the vessel, as shown in Fig. 2. In such case for instance main $l_{12}$ is connected to a switch $S'_1$ on the opposite side of the vessel and corresponding to switch $S_1$, while main $l'_{12}$ is connected to a generator $g'_{12}$ of said opposite side. The arrangement of this other side of the vessel corresponds to the arrangement of the first side shown in Fig. 1 and previously described, similar lettering with prime indexes being used on this opposite side for elements corresponding with those on the side illustrated in Fig. 1.

A further advantage of this improved system resides in the fact that both the starting and reversing operations may be effected quickly, on the one hand, by means of the starting devices provided for the very powerful cruising motor, and, on the other hand, by reason of the fact that the said cruising motor, which is adapted for double frequency, is fed by a generator adapted for average frequency, whereby the possibility is secured to supply the cruising motor with an increased voltage while the generator $g_{21}$ is normally excited, and thus capable of producing for said motor an increased starting moment.

I claim:

1. In a three phase driving system for propellers having a set of generators of a single frequency and a set containing a generator of single and one of double frequency, a motor set connected to the propeller and consisting of a plurality of motors of single frequency and such of double frequency, the method of speed control consisting in connecting first one of single frequency generators of the set, containing the double frequency generator, to the motor of double frequency, then connecting the other set of generators to one of the motors of single frequency, and finally in connecting the first named single frequency generator to a single frequency motor and the double frequency generator to the double frequency motor.

2. A method of controlling a three-phase driving system for marine propellers having a motor set consisting of motors some of them having twice the number of poles as the other motors and two sets of generators, one of them consisting of generators with a frequency common to all of these generators, the other set comprising generators having the same frequency and generators having twice this frequency, which method consists in connecting a generator having a single frequency of the set of generators having different frequencies to a motor having a double number of poles, thereafter connecting the other set of generators to a motor with a single number of poles and finally the set of generators with different frequencies to motors with different pole numbers, the latter corresponding to the frequencies.

3. A method of controlling a three-phase driving system for marine propellers having a motor set consisting of two motors having an equal number of poles, also a generator set consisting of two generators having an equal frequency and a generator set consisting of one generator having the same frequency and one generator having twice this frequency, which method consists in connecting a generator having single frequency of the set of generators having two frequencies to the motor with the double number of poles, running the generator up to full speed, thereafter running the other generator set up to half speed and connecting it to a motor with a single number of poles, then throwing the load on this motor and taking it off the motor first used, cutting down the excitation of this motor, finally connecting the set of generators with different frequencies to the remaining motors with different pole numbers and successively exciting this generator set, while the other generator set is run up to full speed.

4. A three-phase driving system for marine propellers comprising a motor set consisting of motors, some of them having twice the number of poles as the other motors and two sets of generators, one of them consisting of generators with a frequency common to all of these generators, the other set comprising generators with this frequency and generators with twice this frequency, both generator sets adapted to have their speed changed independently from each other, and electrical connections and switches for connecting the motors singly or together to one or more generators of one or both generator sets.

5. A three-phase driving system for marine propellers comprising a system for each propeller having a motor set consisting of motors some of them having twice the number of poles as the other motors and two sets of generators, one of them consisting of generators having a frequency common to all of these generators, the other set comprising generators having the same frequency and generators having twice this frequency, both generator sets adapted to have their speed changed independently from each other, and electric connections between the single driving systems for the propellers for connecting the generator sets consisting of generators with single frequency to the motors with the double number of poles.

In testimony whereof I affix my signature.

WALTHER MOLLIER.